(No Model.)

G. B. BRAYTON.
ENDLESS DRIVING CHAIN.

No. 267,665. Patented Nov. 21, 1882.

Witnesses.
H. E. Lodge
F. G. Simpson

Inventor.
George B. Brayton.
J. Curtis, Atty.

UNITED STATES PATENT OFFICE.

GEORGE B. BRAYTON, OF BOSTON, MASSACHUSETTS, ASSIGNOR TO THE BRAYTON PETROLEUM ENGINE COMPANY, OF SAME PLACE.

ENDLESS DRIVING-CHAIN.

SPECIFICATION forming part of Letters Patent No. 267,665, dated November 21, 1882.

Application filed April 10, 1882. (No model.)

*To all whom it may concern:*

Be it known that I, GEORGE BAILEY BRAYTON, a citizen of the United States, residing at Boston, in the county of Suffolk and State of Massachusetts, have invented certain new and useful Improvements in Endless Driving-Chains; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention comprises an endless chain to be employed as a substitute for belts or gearing in the transmission of power where great tension and safeguard against slip is essential.

My chain is composed substantially of a continuous series of ball-and-socket joints united in an endless band, the spherical or globular cases of these joints in practical use taking into semi-spherical or semi-globular pockets of corresponding size in the perimeter of two or more wheels or pulleys, one of which is the driver and by which the others are put in motion. The spheres or globes are hollow and cast in halves, a screw-thread connection uniting the two semi-globular portions. Each sphere is pierced axially upon opposite poles to screw and surround the stem of a semi-spherical disk, one of such disks occupying one side of each sphere, while the opposite side of such sphere contains a semi-spherical disk in the form of a nut screwed upon the end of the stem of the disk contained in the next adjacent sphere, and so on in succession until the requisite length of chain is built up.

Figure 2:
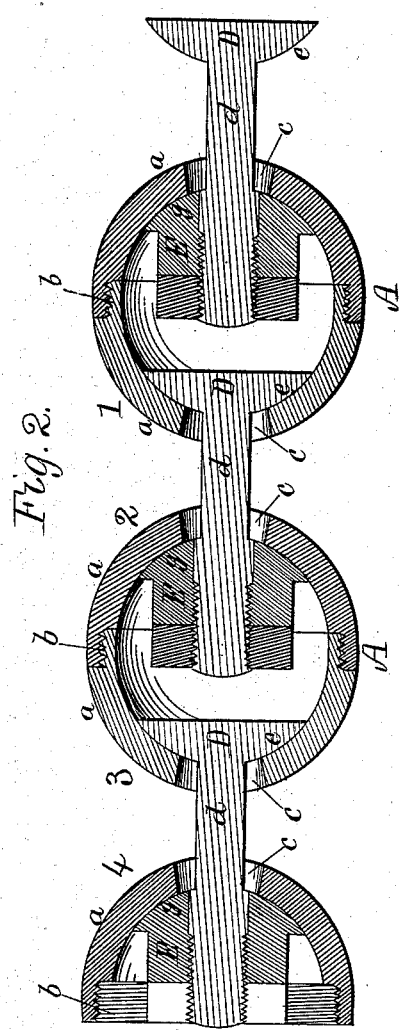
Figure 1:
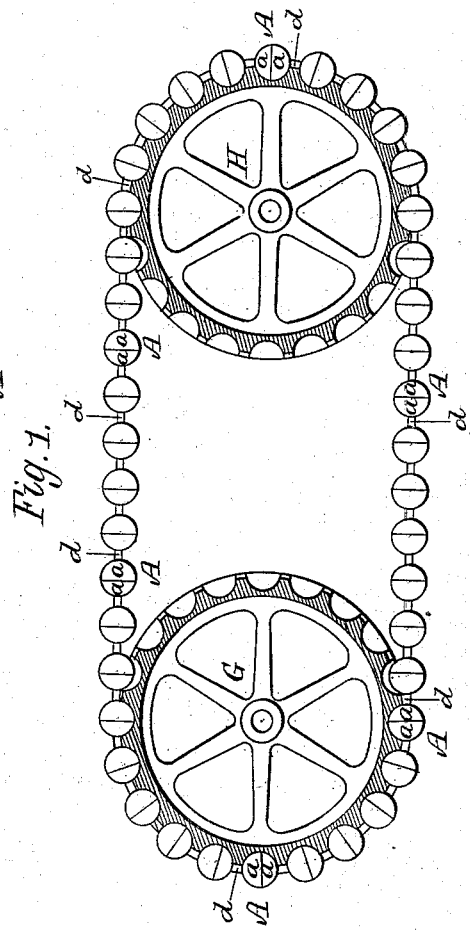

The drawings accompanying this specification represent, in Figure 1, an elevation of an endless chain and two pulleys embodying my invention. Fig. 2 is a section of a portion of the chain.

By reference to the drawings, A A, &c., will be seen to represent a series of hollow, spherical, or globular balls of cast metal, each globe being cast in semi-globular halves *a a*, united by a screw-threaded or other suitable connection, as shown at *b*, and each half being pierced axially and centrally by a circular passage, *c*.

D D represent a series of semi-spherical circular disks or heads, the crown of each of which is continued into a straight axial stem, *d*, of a diameter smaller than the internal diameter of one of the passages or openings, while the crowning face *e* of each head is a segment of a circle of equal diameter with the interior of a sphere in cross-section. Moreover, with each globe A and disk D, I employ a screw-threaded check-nut, E, one end of which has a head, *g*, in size and shape corresponding to that of one of the said disks D, and I cut upon the end of each stem *d* a screw-thread to receive such nut.

In constructing a continuous endless chain of the above elements I first pass one of the stems *d* through an opening, *c*, (of a semi-sphere, which may be numbered 1) from the inside until the head D of such stem brings up against the interior wall of such semi-sphere, and I then pass the screw-threaded end of this stem through the opening of another semi-sphere, which may be designated as "No. 2" from the outside, and I then screw upon such screw-threaded end, and within the semi-sphere last named, one of the nuts E. I have now confined together one half of two adjacent spheres A. I continue by simply repeating the operation—that is, I take a second stem *d* and insert it from the inside, as at first, through the opening of a third semi-sphere, which may be designated as "No. 3," and I then screw together the semi-spheres 2 and 3. The screw-threaded end of the second stem is now inserted from the outside in an opening in a fourth semi-sphere, which may be designated as "No. 4," and a nut E screwed upon such screw-thread. These acts are to be repeated necessarily until the desired length of chain is built up, when its ends are closed by inserting the screw-threaded stem from one end of one semi-sphere into the opposite end of the adjacent semi-sphere, adding a nut E, and screwing the two semi-spheres together. The crowning-face of each nut constitutes a rocking bearing upon one side of a sphere, A, and the head of the next adjacent stem *d* performs a like friction in the opposite half of such sphere.

In use of a chain of this construction each wheel or pulley G or H about which it passes, or at least the driver and transmitter wheels, are to be provided upon their peripheries with a series of equidistant semi-globular pockets to receive the spherical sections of the chain; and as no slip can occur between the wheel and chain, a positive motion is the result.

By my method of construction I am enabled to produce endless driving chains of any desired strength. By uniting the sections by the nut screwing upon the connecting-stems, as explained, I am enabled to adjust the "pitch" of the sections as desired, and at the same time introduce a compensating element to make good any lengthening of the chain by stretch or wear.

To maintain the various spheres and their connecting-stems in their normal positions—that is, in axial alignment at such times as the chain is straight or normal to any curve described by the chain, whether a simple or irregular curve—I elongate each sphere A slightly between the head and nut E, contained within it, by which the tensile strain upon each stem $d$ tends to force such stem to the center of the opening $c$ containing it.

In addition to the nut E a check-nut, F, may be screwed upon the extreme end of each stem or link $d$, to lock the nut E in position.

The opening $c$ in the sides of the hollow spheres is made smaller than the head of link or stem $d$, and sufficiently large to allow the free insertion and withdrawal of the body of the link through the same when preparing the chain for operation. The head of the link fits in the axial elongation in the hollow spheres, hereinbefore described, and by means of which the body of the link is forced into or tends to occupy its normal position in said opening, which, as will be seen, is in the center thereof.

I claim—

1. A chain composed of hollow spheres cast in sections united by screw-threaded or other proper connections, and each sphere connected with the next adjacent one by a double-headed link or stem, one of the heads of which is screwed upon the body of said link or stem.

2. In a chain composed of hollow spheres united by double-headed links or stems, one of the heads of which is secured to the body of the link by screw-threads formed thereon, the said spheres each having an axial elongation near the head of link $d$ contained within it, whereby the strain upon said link tends to keep it in the normal position.

3. A chain composed of hollow spheres united by double-headed links or stems, one head of which is made removable from said link, whereby the chain can be lengthened or shortened, as desired.

4. In a chain composed of hollow spheres united by double-headed links or stems, each sphere composed of two hollow semi-spheres united by a screw-thread or other joint.

In testimony whereof I affix my signature in presence of two witnesses.

GEORGE BAILEY BRAYTON.

Witnesses:
H. E. LODGE,
F. CURTIS.